United States Patent [19]
Uesugi et al.

[11] 3,846,489
[45] Nov. 5, 1974

[54] PROCESS FOR PRODUCTION OF BETA-ALANINE

[75] Inventors: Hideyuki Uesugi; Tsutomu Takeda, both of Yokosuka, Japan

[73] Assignee: Tokyo Fine Chemical Co., Ltd., Tokyo, Japan

[22] Filed: Dec. 17, 1971

[21] Appl. No.: 209,338

[30] Foreign Application Priority Data
Dec. 29, 1970  Japan............................ 45-120883
Dec. 29, 1970  Japan............................ 45-120884
Dec. 29, 1970  Japan............................ 45-120885
Dec. 29, 1970  Japan............................ 45-120886

[52] U.S. Cl............................................ 260/534 C
[51] Int. Cl............................................. C07c 99/00
[58] Field of Search........260/534 C, 482 R, 482 A, 260/534 C, 534 R

[56] References Cited
UNITED STATES PATENTS
2,335,997  12/1943  Carlson et al............... 260/534 C
2,376,334  5/1945   Babcock et al.............. 260/534 C
2,416,630  2/1947   Kirk............................. 260/534 C
3,105,092  9/1963   Poppelsdorf................. 260/534 C
3,642,888  2/1972   Matsui et al................. 260/534 C

OTHER PUBLICATIONS
Muller, Methods of Organic Chemistry, XI, p. 267, (1957).
Poppelsdorf et al., J. Org. Chem. 26, 262, (1961).

*Primary Examiner*—Lorraine A. Weinberger
*Assistant Examiner*—John F. Terapane
*Attorney, Agent, or Firm*—Wenderoth, Lind & Ponack

[57] ABSTRACT

The present invention relates to a process for producing $\beta$-alanine in excellent yields, said $\beta$-alanine being useful as a starting material for producing certain medicines and feed additives, which process comprises inhibiting the formation of 3,3'-imino dipropionic acid and other by-products the reaction of acrylic acid and/or acrylic esters with aqueous ammonia, by the addition of ammonium carbonates and/or $CO_2$ into the reaction mixture, and, furthermore, converting the by-products to $\beta$-alanine.

4 Claims, No Drawings

PROCESS FOR PRODUCTION OF BETA-ALANINE

BACKGROUND OF THE INVENTION

1. Field of the Invention

The present invention relates to a process for producing β-alanine, and, in particular, to an improved process of producing β-alanine from acrylic acid and/or esters.

2. Description of the Prior Art

In regard to the production of β-alanine useful as a starting material for producing certain medicines and the like, several methods have been proposed up to now.

One of the processes which is industrially advantageous in respect to the raw materials involved as well as the reaction conditions is based on the reaction of acrylic acid and/or acrylic esters with aqueous ammonia at relatively high temperatures and pressures. (see, for example, U.S. Pat. No. 2,376,334; British Pat. No. 561,013; Journal of Org. Chem. 26, P. 262 (1961) )

However, it is well known that in the processes described in the literatures above-mentioned large amounts of 3, 3'-imino dipropionic acid (hereinafter shown briefly as "IDPA") are always formed together with β-alanine. Accordingly, the formation of β-alanine is reduced and its yield is maintained at 40 per cent of its theoretical yield in respect to the acrylic acid and/or acrylic ester starting materials. Since IDPA usually contains a certain amount of the monoammonium salt thereof, the IDPA referred to in this specification also contains the mono-ammonium salt.

Manufacturers have long searched for a method of producing β-alanine in increased yields but have had difficulty in this regard for the reasons stated above.

The objects of the present invention are to inhibit the formation of IDPA and other by-products, to convert IDPA formed by the reaction or which exists in the reaction system to β-alanine, and thus to produce β-alanine in excellent yields.

SUMMARY OF THE INVENTION

In the present invention, it has been found that the objects above-mentioned are achieved by the addition of ammonium carbonates and/or introduction of gaseous $CO_2$ to the reaction system containing acrylic acid and/or acrylic esters together with ammonia as the reactants.

It has been found also that the objects are especially achieved by the addition of ammonium carbonates and/or introduction of gaseous $CO_2$ to the reaction system comprising acrylic acid and/or acrylic ester and ammonia in the presence of 3, 3'-imino dipropionic acid.

DETAILED DESCRIPTION OF THE INVENTION:

One of the industrially advantageous processes for manufacturing β-alanine is the process comprising the reaction of acrylic acid and/or acrylic esters with aqueous ammonia by heating under high pressure. In this process, however, appreciable amounts of 3, 3'-imino dipropionic acid are formed as a by-product together with β-alanine.

The reactions involved in this process are believed to be in the relation as following:

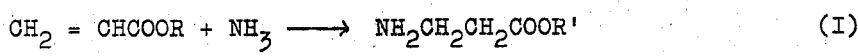

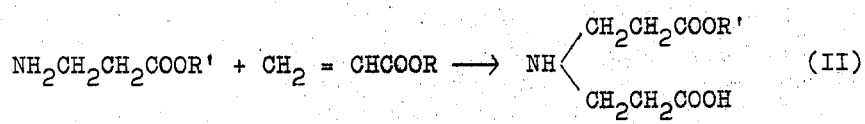

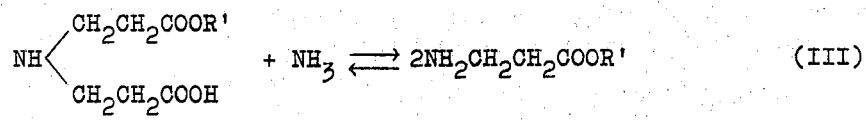

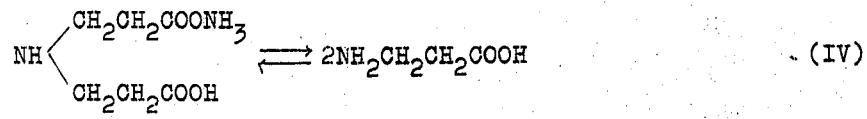

wherein R represents hydrogen, $CH_3$ or $C_2H_5$, and R' represents hydrogen or $NH_4$. Among these steps, III and IV seem to be in an equilibrium state.

If the reaction II is inhibited and equilibria of the reaction III and IV proceed in the right direction, β-alanine may obviously be produced in high yields. Therefore, it is believed that the high yields may be attained with the protection of the amino-group ($NH_2$-) of the β-alanine formed by the reaction. For this reason, experiments were carried out concerning the addition of ammonium carbonates and/or the introduction of gaseous $CO_2$ into the reaction system comprising acrylic acid and/or acrylic esters and ammonia. In accordance with the present invention, it has been supposed that carbonic ions generated in solutions containing ammonium carbonates and/or $CO_2$ add to the amino group of β-alanine formed by the reaction, protecting the amino group as in equation V and inhibit the formation of by-products. The experiments succeeded as supposed, and β-alanine had been obtained in excellent yields.

That is, according to the present invention, the formation of by-products in the reaction of acrylic acid and/or acrylic esters with ammonia is markedly inhibited, and IDPA which has been formed or present in the reaction mixture is converted to β-alanine, and β-alanine is manufactured in high yield, by the addition of ammonium carbonates and/or introduction of $CO_2$ to the mixture.

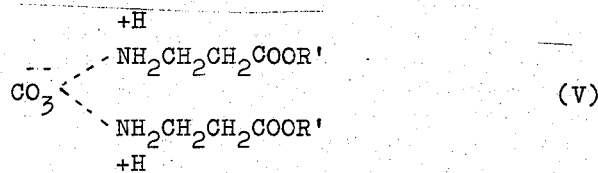

(V)

As will be understood from the description above-stated, the present invention provides a process for manufacturing β-alanine, comprising adding ammonium carbonates and/or introducing gaseous $CO_2$ to reaction systems consisting of acrylic acid and/or acrylic esters and aqueous ammonia, with or without the presence of IDPA.

According to the present invention, ammonium carbonates which should be added to such reaction systems are ammonium carbonate, ammonium hydrogen carbonate (ammonium bicarbonate) and ammonium hydrogen carbonate carbamate. Any one or more of the salts may be used in the total amount of 0.5 to 1.5 moles, calculated on the basis of the carbonate ion, to 1 mole of acrylic acid and/or acrylic esters. It is preferable that the amount in the presence of IDPA is additionally increased in the range from 0.5 to 1.5 moles to 1 mole of IDPA calculated as 3, 3'-imino dipropionic acid). When gaseous $CO_2$ is introduced into the reaction system, its proper quantity is in the range of from 0.5 to 1.5 moles to 1 mole of acrylic acid and/or acrylic esters. Furthermore, the proper quantities of gaseous $CO_2$ which is introduced into the reaction mixture containing IDPA are in the range of from 0.5 ~ 1.5 moles to each 1 mole of acrylic acid and/or acrylic esters and IDPA (assumed as 3, 3'-imino dipropionic acid). Both the ammonium carbonates and gaseous $CO_2$ may be used together. In this case, sums of each mole of them calculated as carbonate ion is preferably in the range above-stated. In all cases of using ammonium carbonates, gaseous $CO_2$, or both, desirable effects can not be attained except when the proportions are as stated above. Especially, a large excess of gaseous $CO_2$ should be avoided because it causes decreased yields of β-alanine as well as causing deterioration of the β-alanine.

In any cases, the amount of IDPA which should be added to the reaction of acrylic acid and/or acrylic esters with aqueous ammonia is from 0.5 to 5 parts to 1 part of acrylic acid and/or acrylic esters.

Concentrations of the aqueous ammonia used in any cases are preferably 20 percent or more, and are usually 20 ~ 25%. More concentrated ammonia, however, may be also used.

The amounts of aqueous ammonia used should be 5 moles or more, to 1 mole of the acrylic acid and/or acrylic esters, and further addition of 5 moles or more of aqueous ammonia is required to 1 mole of IDPA (calculated as 3, 3'-imino dipropionic acid).

In accordance with the present invention, the preferable reaction temperature is 100° to 200°C, especially 150° to 200°C. Reaction times are about 1 to 5 hours, and pressures may be the spontaneous pressure upon heating.

By the addition of ammonium carbonates and/or introduction of gaseous $CO_2$ under such conditions, the formation of IDPA and other by-products are remarkably inhibited and β-alanine is obtained in far higher yields than other processes.

In all the cases, water, ammonia and ammonium carbonates are distilled off in vacuo from the reaction mixture obtained according to processes of the present invention, the residue is treated with methanol and the crystallization is performed. Thus β-alanine is obtained easily in excellent over-all yield, without complex processes such as hydrolysis, desalting by ion-exchangers and recrystallization.

The mother liquor after isolation of β-alanine by such a method contains a large amount of IDPA which is not yet converted to β-alanine. When solvents in the mother liquor are distilled off in vacuo, IDPA remains as the residue and may be immediately used as a raw material for the next reaction without further treatments. That is, with circulation of IDPA the continuous productions of β-alanine are possible. When the reaction conditions are constantly maintained, the amount of IDPA obtained after separation of β-alanine coincides, thoroughly with the amount that had been previously added to the reaction system, and β-alanine can be produced in excessively high yields with simple treatments.

It is desirable that each of the acrylic acid and/or acrylic ester, aqueous ammonia, ammonium carbonates, gaseous $CO_2$ and IDPA are supplied to the reaction system always at constant amounts.

When IDPA is recycled to the process of producing β-alanine without the application of the present invention, therefore, without use of ammonium carbonates and/or gaseous $CO_2$, the by-product IDPA accumulates in the recycle system.

Thus, the yield of β-alanine decreases and crystallization becomes difficult.

In accordance with the present invention, the following satisfactory effects are obtained:

1. IDPA is utilized completely and effectively,
2. the process for manufacturing β-alanine is simplified,
3. yields of β-alanine becomes nearly 100 percent, and
4. β-alanine may be continuously produced in excellent yields.

The invention is illustrated by the following examples, wherein all parts and percent are by weight unless otherwise specifically indicated.

EXAMPLE 1

A mixture of 24.4 parts of methyl acrylate (containing 200 ppm of hydroquinone), 240 parts of 25 percent aqueous ammonia, and 25 parts of ammonium carbonate was heated at 160°C for 4 hours in an autoclave, and then was allowed to come to room temperature. The reaction mixture was treated with active charcoal, and heated at 60°C under reduced pressure on a water bath to remove water ammonia, ammonium carbonates and methanol generated by the reaction. Syrup was obtained in quantity of 25.5 parts as residue. The syrup was mixed with 70 parts of methanol and dissolved. The mixture was allowed to stand at room temperature to produce crystals.

This mixture containing the crystals was heated at reflux temperature for 1 hour on a water bath, and cooled to room temperature. The crystals were filtered out, washed with a small amount of methanol, and dried in vacuo. There were obtained 18 parts of white crystalline β-alanine.

EXAMPLE 2

A mixture of 26.2 parts of acrylic acid (containing 200 ppm of methoxy hydroquinone), 225 parts of 28 percent aqueous ammonia and 47 parts of commercially obtainable ammonium carbonate was heated at 180°C for 3 hours in an autoclave, and then was allowed to come to room temperature. The reaction mixture was treated with active charcoal and heated on a water bath in vacuo to distill off water, ammonia and ammonium carbonates which were present in the mixture. Syrup was obtained in quantity of 32.5 parts. The syrup was mixed with 80 parts of methanol and dissolved. The mixture was treated as described in Example 1. There was obtained 23 parts of white crystalline β-alanine m.p.: 198° ~ 200°C.

EXAMPLE 3

A mixture of 20 parts of acrylic acid (containing 200 ppm of methoxyhydroquinone), 228 parts of 28 percent aqueous ammonia, 27 parts of syrupy IDPA and 37 parts of ammonium hydrogen carbonate was heated at 160°C for 4 hours in an autoclave, and then was allowed to come to room temperature. The reaction mixture was decolorized with active charcoal and heated on a water bath in vacuo to distill off water, ammonia and ammonium carbonates which were present in the mixture. Syrup was obtained a quantity of 54 parts. The syrup was mixed with 150 parts of methanol and dissolved. The mixture was treated as described in Example 1. There was obtained 23.5 parts of white crystalline β-alanine, which corresponded to 95 percent of the theoretical yield in respect to the supplied acrylic acid, m.p.: 198° ~ 200°C.

On the other hand, from the mother liquor after removal of crystalline β-alanine by centrifuge, methanol was distilled off, and 31 parts of syrupy IDPA were recovered.

EXAMPLE 4

A mixture comprising 25 percent aqueous ammonia, IDPA and ammonium carbonate and acrylic acid in a ratio 12.6 : 2.84 : 2.48 : 1 was delivered continuously to a 4-liter continuous high pressure reactor at 160°C through a displacement pump. The residence time of the mixture was controlled to 2.5 hours during the reaction. Out of the reaction-mixture which had been released from the reactor after an operation of over 6 hours, 1.6 litres of it was concentrated in vacuo, and 373 grams of syrup were obtained as the residue. The syrup was mixed with 1.2 litres of methanol and dissolved. The mixture was allowed to stand at room temperature to produce crystals. This mixture containing the crystals was heated at a reflux temperature of 1 hour on a water bath, and cooled to room temperature. The crystals were filtered out, washed with a small amount of methanol and dried at 60°C in vacuo. There were obtained 111.5 grams of white crystalline β-alanine, which corresponded to 98.3 percent of the theoretical yield in respect to the supplied acrylic acid. m.p.: 198 ~ 200°C.

On the other hand, from the mother liquor after removal of the crystals of β-alanine by filteration, methanol was distilled off, and 262 grams of syrupy IDPA were recovered as residue.

EXAMPLE 5

A mixture of 30 parts of ethyl acrylate (containing 200 ppm of hydroquinone), 225 parts of 25 percent aqueous ammonia was charged into an autoclave, and then 14 parts of gaseous $CO_2$ were introduced into the autoclave at 20°C under pressure of 140 p.s.i.g. The mixture was gradually heated to 150°C and maintained at the same temperature for 4 hours. Thereafter the mixture was allowed to come to room temperature. It was then decolorized with active charcoal and heated at 60°C in vacuo on a water bath to distill off water, ammonia, ammonium carbonates and ethanol generated by the reaction. Thus 26.5 parts of syrup was obtained the residue. The syrup was mixed with 72 parts of methanol and dissolved. The mixture was allowed to stand at room temperature to produce crystals. The mixture containing the crystals was heated at reflux temperature for 1 hour and cooled. The crystals were filtered out, washed with a small quantity of methanol and dried at 60°C in vacuo. There was obtained 19 parts of white crystalline β-alanine, which corresponded to 71 percent of the theoretical yield in respect to the supplied ethyl acrylate. m.p.: 198° ~ 199°C.

EXAMPLE 6

A mixture of 22 parts of acrylic acid (containing 200 ppm of methoxyhydroquinone, and 225 parts of 25 percent aqueous ammonia was charged into an autoclave, and then 18 parts of gaseous $CO_2$ were introduced at 20°C under pressure of 140 p.s.i.g. into the autoclave. The mixture was gradually heated to 160°C and maintained at the same temperature for 3 hours. The mixture was allowed to come to room temperature and treated with active charcoal. Thereafter it was heated at 60°C in vacuo on a water bath to distill off water, ammonia and ammonium carbonates. Thus 27 parts of syrup were obtained. The syrup was mixed with 72 parts of methanol and treated according to the process described in Example 1. There were obtained 19 parts of white crystalline β-alanine, which corresponded to 71.7 percent of the theoretical yield to the supplied acrylic acid.

EXAMPLE 7

A mixture of 24.4 parts of methyl acrylate (containing 200 ppm of hydroquinone), 225 parts of 25 percent aqueous ammonia, and 25 parts of IDPA was charged into an autoclave, and then 14 parts of gaseous $CO_2$ at 20°C under a pressure of 140 p.s.i.g. were introduced into the autoclave. The mixture was gradually heated to 150°C and maintained at the same temperature for 3 hours. The reaction mixture was allowed to come to room temperature and treated with active charcoal. Thereafter it was heated at 60°C in vacuo on a water bath to distill off water, ammonia, ammonium carbonates and methanol generated by the reaction. Thus 50 parts of syrup were obtained as the residue. The syrup was mixed with 120 parts of methanol and dissolved, and then allowed to stand at room temperature to produce crystals. The mixture containing the crystals was heated at reflux temperature for 1 hour on a water bath, and cooled to room temperature. The crystals were filtered out, washed with small quantity of methanol, and dried in vacuo. There were obtained 23.5 parts of white crystalline β-alanine, which corresponded to 93 percent of the theoretical yield in respect to the supplied methyl acrylate.

On the other hand, the mother liquor after separation of β-alanine, was concentrated in vacuo to distill off methanol. Thus 26 parts of syrupy IDPA was recovered as the residue.

EXAMPLE 8

A mixture of 19 parts of acrylic acid (containing 200 ppm of methoxyhydroquinone), 225 parts of 25 percent aqueous ammonia, and 26 parts of syrupy IDPA recovered in Example 7 was charged into an autoclave, and then 14 parts of gaseous $CO_2$ at 20°C under pressure of 140 p.s.i.g. were introduced into the autoclave. The mixture was gradually heated and maintained at 160°C for 4 hours. The reaction mixture was allowed to come to room temperature and treated as Example 3, yielding 50.5 parts of syrup. The syrup was mixed with 120 parts of methanol and dissolved, and then allowed to stand at room temperature to produce crystals. After treatment of the crystals according to Example 7, there were obtained 22 parts of white crystalline β-alanine, which corresponded to 93.5 percent of the theoretical yield based on the supplied acrylic acid. m.p.: 198° ~ 200°C.

On the other hand, the mother liquor after removal of β-alanine was treated as Example 3, and 27.5 parts of syrupy IDPA were recovered.

EXAMPLE 9

A solution comprising 28 percent aqueous ammonia, IDPA and acrylic acid in a 12 : 2.8 : 1 ratio by weight was derived continuously at 150°C into a 4-litre continuous high pressure reactor at 150°C through a displacement pump so as to gain a residence time of 3 hours. At the same time, gaseous $CO_2$ of 700 p.s.i.g. at 20°C was introduced continuously to the reactor in a ratio of 1.5 parts to 1 part of acrylic acid. Out of the reaction mixture discharged from the reactor on the operation over 4 hours, 1.33 litres of it was divided and concentrated in vacuo. As the residue, 308 grams of syrup was obtained. The syrup was mixed with 1 litre of methanol, and dissolved. The mixture was allowed to stand at room temperature, and a white crystalline solid was formed. The solid was treated as in Example 7. There were obtained 94.5 grams of white crystalline β-alanine, which corresponded to 97.7 percent of the theoretical yield to the supplied acrylic acid. m.p.: 197° ~ 200°C.

On the other hand, the mother liquor after removal of β-alanine was treated as in Example 7, and 213 grams of syrupy IDPA were recovered.

EXAMPLE 10

A mixture comprising 25 percent aqueous ammonia, IDPA, commercially obtainable ammonium carbonate and acrylic acid in a 22 : 2.86 : 2 : 1 ratio by weight was derived continuously at 150°C into a 4-litre continuous high pressure reactor through a displacement pump so as to make for a residence time of 3 hours. At the same time, gaseous $CO_2$ of 700 p.s.i.g. at 20°C was introduced continuously into the reactor in a ratio of 0.3 part of 1 part of acrylic acid. Out of the reaction mixture discharged from the reactor on the operation over 4 hours, 2 litres of it was divided and concentrated in vacuo. As the residue, 446 grams of syrup was obtained. The syrup was mixed with 1.7 litre of methanol and dissolved. The mixture was allowed to stand at room temperature, and a white crystalline solid was formed. The solid was treated as in Example 7. There were obtained 132 grams of white crystalline β-alanine, which corresponded to 98 percent of the theoretical yield in respect to the supplied acrylic acid. m.p.: 198° ~ 200°C.

On the other hand, the mother liquor after separation of β-alanine was treated as in Example 7, and 314 grams of syrupy IDPA was recovered.

The nitrogen-analyses of β-alanine obtained in the Examples above-described are set forth in the following table.

| No. of Example | 1 | 2 | 3 | 4 | 5 | 6 | 7 | 8 | 9 | 10 |
|---|---|---|---|---|---|---|---|---|---|---|
| Nitrogen % | 15.58 | 15.60 | 15.60 | 15.74 | 15.62 | 15.78 | 15.57 | 15.72 | 15.68 | 15.70 |

What is claimed is:

1. A process for producing β-alanine by the reaction of acrylic acid or methyl or ethyl acrylate with aqueous ammonia at a temperature of 100°C to 200°C for a time of 1 to 5 hours, which consists essentially of effecting the reaction in the copresence of ammonium carbonates and 3,3'-imino dipropionic acid, in which said ammonium carbonates are used in an amount of 0.5 to 1.5 moles on the basis of the carbonate ion per mole of acrylic acid or methyl or ethyl acrylate and additionally 0.5 to 1.5 moles of said carbonate ion are used for each mole of 3,3'-imino dipropionic acid, said 3,3'-imino dipropionic acid being added in an amount of 0.5 to 5 parts by weight to 1 part by weight of acrylic acid or methyl or ethyl acrylate; and wherein the aqueous ammonia is used in a concentration 20 percent or more such that the aqueous ammonia is present in an amount of 5 moles or more per mole of acrylic acid or methyl or ethyl acrylate and an additional 5 moles or more per mole of 3,3-imino dipropionic acid.

2. A process according to claim 1, wherein said ammonium carbonates are selected from the group consisting of ammonium carbonate, ammonium hydrogen carbonate and ammonium hydrogen carbonate carbamate.

3. A process according to claim 1, wherein gaseous $CO_2$ is introduced into the reaction system as a part or whole source for the ammonium carbonates.

4. A process according to claim 1, wherein the amount of said gaseous $CO_2$ is 0.5 to 1.5 moles per mole of each acrylic acid or methyl or ethyl acrylate and 3,3'-imino dipropionic acid.

* * * * *